(12) United States Patent
Tseng et al.

(10) Patent No.: US 11,682,957 B2
(45) Date of Patent: Jun. 20, 2023

(54) IRONLESS LINEAR MOTOR

(71) Applicant: TOYO AUTOMATION CO., LTD., Tainan (TW)

(72) Inventors: Kun-Cheng Tseng, Tainan (TW); Kuei-Tun Teng, Tainan (TW); Kai-Han Teng, Tainan (TW)

(73) Assignee: Toyo Automation Co., Ltd., Tainan City (TW)

( * ) Notice: Subject to any disclaimer, the term of this patent is extended or adjusted under 35 U.S.C. 154(b) by 372 days.

(21) Appl. No.: 17/088,857

(22) Filed: Nov. 4, 2020

(65) Prior Publication Data
US 2022/0014083 A1    Jan. 13, 2022

(30) Foreign Application Priority Data

Jul. 13, 2020   (TW) ................................ 109123569

(51) Int. Cl.
*H02K 3/47* (2006.01)
*H02K 41/03* (2006.01)

(52) U.S. Cl.
CPC ............. *H02K 41/031* (2013.01); *H02K 3/47* (2013.01)

(58) Field of Classification Search
CPC ............................... H02K 3/47; H02K 41/031
See application file for complete search history.

(56) References Cited

U.S. PATENT DOCUMENTS

| | | | | |
|---|---|---|---|---|
| 6,373,164 | B1 * | 4/2002 | Nishimura | H02K 3/12 |
| | | | | 310/198 |
| 2002/0079775 | A1 * | 6/2002 | Janssen | H02K 15/045 |
| | | | | 310/206 |
| 2010/0295385 | A1 * | 11/2010 | Hsu | H02K 41/03 |
| | | | | 310/12.22 |
| 2016/0105087 | A1 * | 4/2016 | Ikeda | H02K 15/04 |
| | | | | 310/12.22 |

* cited by examiner

*Primary Examiner* — Dang D Le
(74) *Attorney, Agent, or Firm* — Rosenberg, Klein & Lee

(57) ABSTRACT

A coil assembly includes coil units connected to a coil base. Each coil unit includes top, intermediate and bottom coil modules, each of which has spaced-apart first and second interaction sides, and two non-interaction sides connected to the first and second interaction sides to form an accommodating space. The first interaction sides of the intermediate and bottom coil modules are juxtaposed with each other in the accommodating space of the top coil module. The second interaction sides of the top and intermediate coil modules are juxtaposed with each other in the accommodating space of the bottom coil module. An ironless motor includes a magnetic rail assembly and the aforesaid coil assembly.

8 Claims, 8 Drawing Sheets

US 11,682,957 B2

IRONLESS LINEAR MOTOR

CROSS-REFERENCE TO RELATED APPLICATION

This application claims priority to Taiwanese Patent Application No. 109123569, filed on Jul. 13, 2020.

FIELD

The disclosure relates to a motor, and more particularly to an ironless linear motor and a coil assembly thereof.

BACKGROUND

There are three types of coil assemblies for ironless linear motors: a non-overlapping concentrated winding type, an overlapping concentrated winding type, and a printed circuit board type. FIG. 1 illustrates a coil assembly 11 of an ironless linear motor that is an overlapping concentrated winding type to generate a larger driving force in a relatively small space. The coil assembly 11 includes four coil units 12 which are serially aligned and each of which is reversed relative to and overlapped adjacent other coil units. Each coil unit 12 includes two first coil modules 121 and one second coil module 122 to constitute a three-phase coil structure.

However, there is a room for improving space utilization rate and volume power density of the coil assemblies of linear motors.

SUMMARY

Therefore, one object of the disclosure is to provide a coil assembly that can improve space utilization rate and that can provide effective power density.

According to the object of the disclosure, a coil assembly includes a coil base elongated in an X-direction, and a plurality of coil units arranged in the X-direction and connected to the coil base.

Each of the coil units includes a top coil module, an intermediate coil module, and a bottom coil module. Each of the top, intermediate and bottom coil modules has a first interaction side, a second interaction side spaced apart from the first interaction side in the X-direction, and two non-interaction sides that are spaced apart from each other in a Y-direction transverse to the X-direction and that are connected to the first interaction side and the second interaction side.

The first and second interaction sides and the non-interaction sides of each of the top, intermediate and bottom coil modules cooperatively form a loop that surrounds an accommodating space.

The first interaction sides of the intermediate and bottom coil modules are juxtaposed with each other and situated within the accommodating space of the top coil module.

The second interaction sides of the top and intermediate coil modules are juxtaposed with each other and situated within the accommodating space of the bottom coil module.

Another object of the disclosure is to provide an ironless linear motor.

Accordingly, an ironless linear motor includes a magnetic rail assembly and a coil assembly.

The magnetic rail assembly includes spaced-apart upper and lower rows of magnetic members extending in an X-direction, positive and negative polarities of the magnetic members of each of the rows alternating with each other in the X-direction.

The coil assembly is slidable between the two rows of the magnetic members. The coil assembly includes a coil base elongated in the X-direction, and a plurality of coil units arranged in the X-direction and connected to the coil base.

Each of the coil units includes a top coil module, an intermediate coil module, and a bottom coil module. Each of the top, intermediate and bottom coil modules has a first interaction side, a second interaction side spaced apart from the first interaction side in the X-direction, and two non-interaction sides that are spaced apart from each other in a Y-direction transverse to the X-direction and that are connected to the first interaction side and the second interaction side.

The first and second interaction sides and the non-interaction side of each of the top, intermediate and bottom coil modules cooperatively form a loop that surrounds an accommodating space.

The first interaction sides of the intermediate and bottom coil modules are juxtaposed with each other and situated within the accommodating space of the top coil module.

The second interaction sides of the top and intermediate coil modules are juxtaposed with each other and situated within the accommodating space of the bottom coil module.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
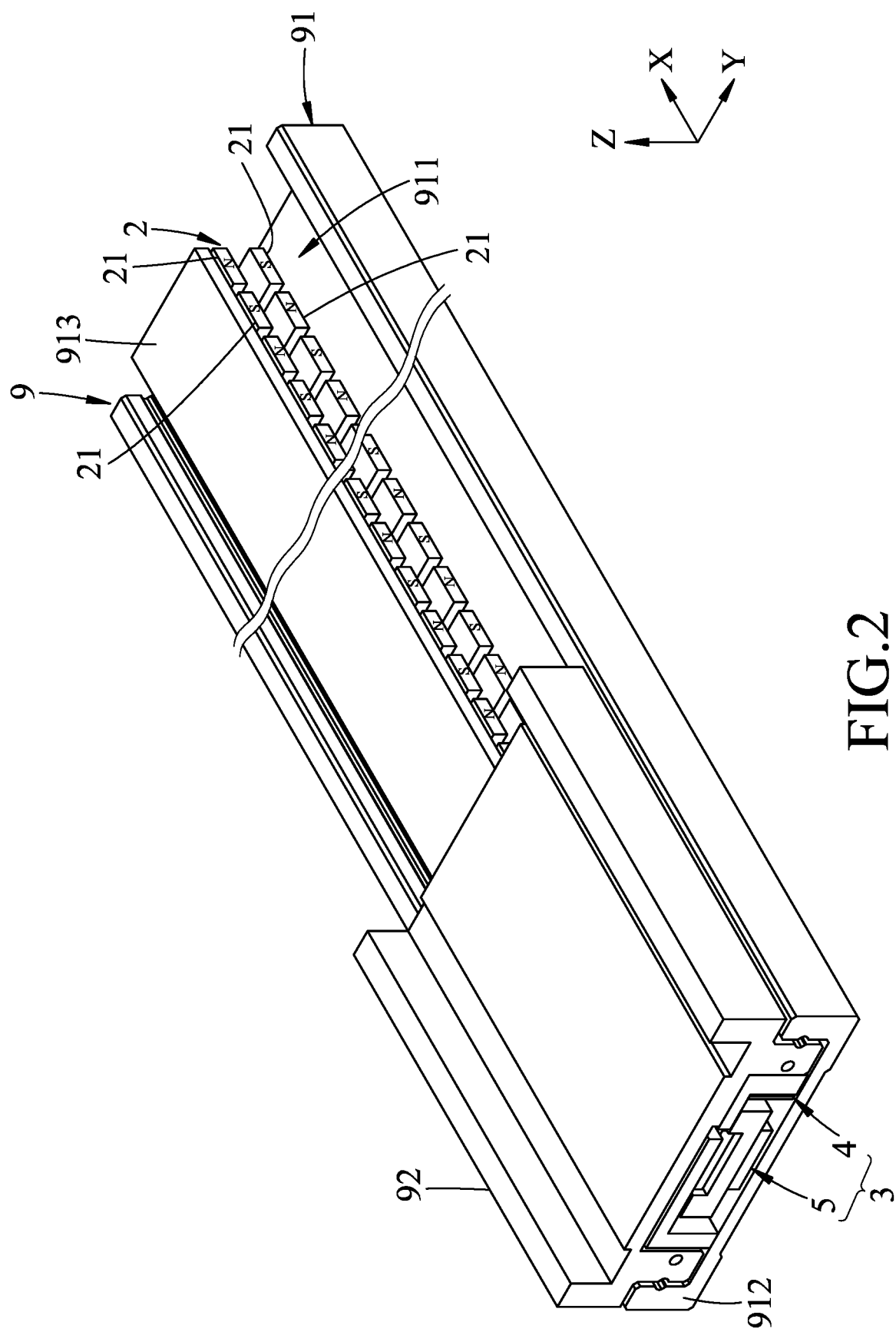
FIG. 2 is a perspective view illustrating an ironless linear motor according to an embodiment of the disclosure and a linear slide unit.
Figure 3:
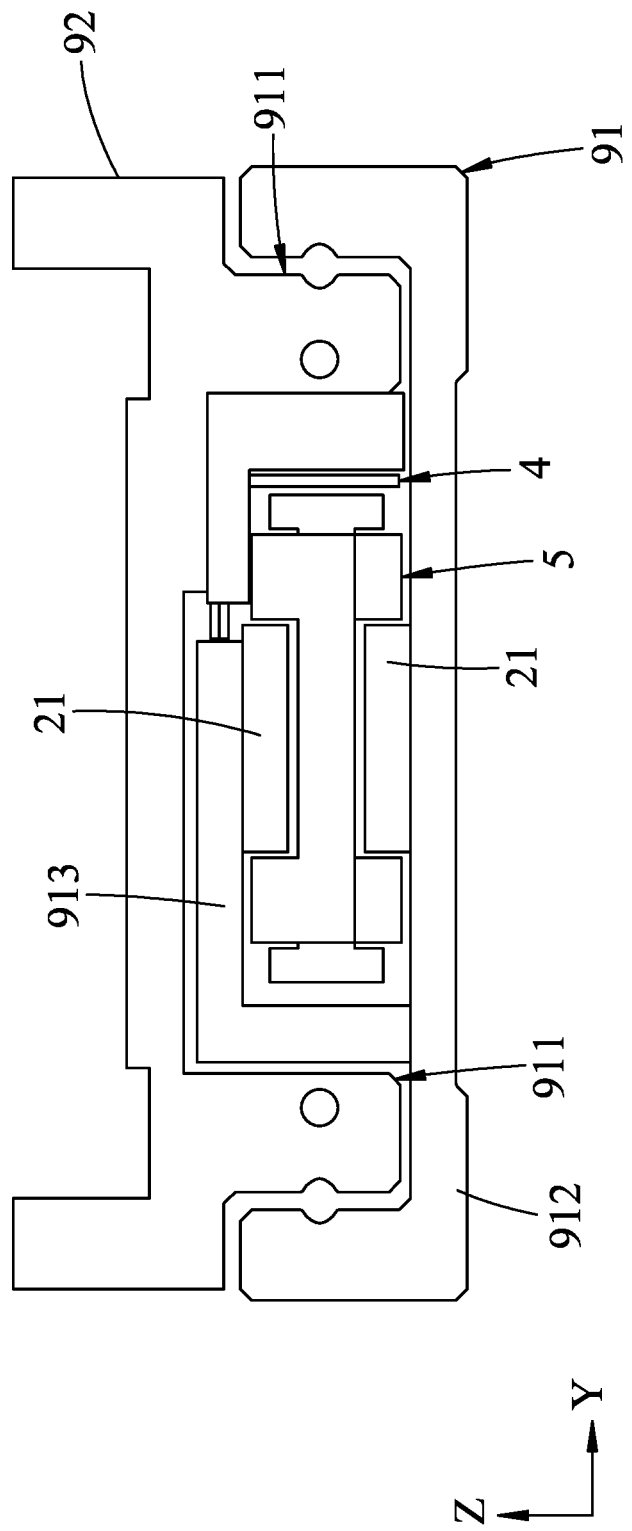
FIG. 3 is a side view of the embodiment.
Figure 4:
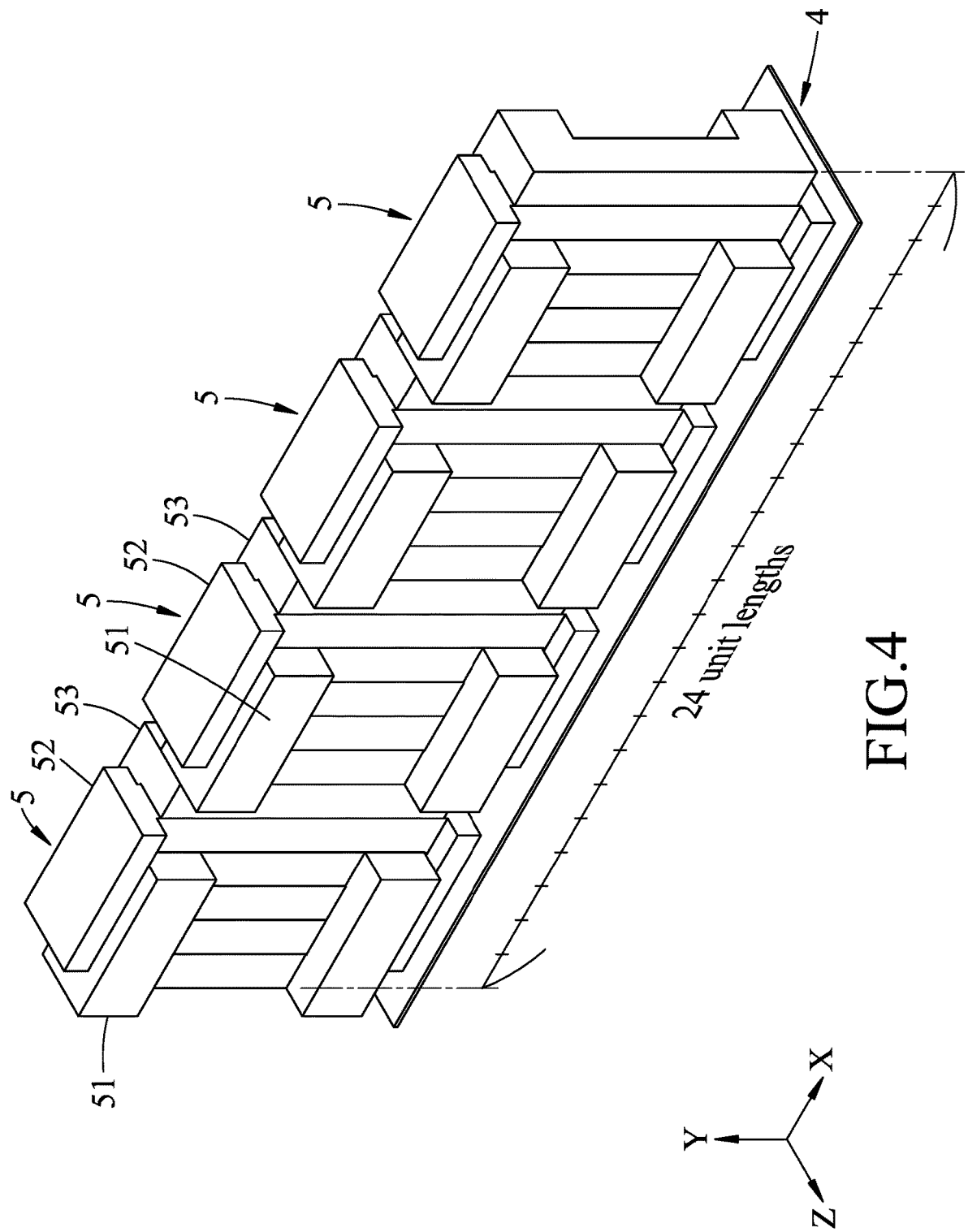
FIG. 4 is a perspective view of the embodiment illustrating coil units juxtaposed with each other on a circuit board.

FIGS. 2 to 4 illustrate an ironless linear motor according to an embodiment of the disclosure suitable for a linear slide unit 9. The linear slide unit 9 includes a linear rail 91, and a carriage 92 slidably disposed on the linear rail 91 for supporting a worktable (not shown) or a workpiece (not shown). The linear rail 91 has a rail base 912 and an upper rail member 913 disposed inside the rail base 912. The rail base 912 and the upper rail member 913 cooperatively define two sliding spaces 911. The ironless linear motor of the disclosure includes a magnetic rail assembly 2 and a coil assembly 3.

The magnetic rail assembly 2 includes two spaced-apart upper and lower rows of magnetic members 21 extending in an X-direction and respectively disposed on the rail base 912 and the upper rail member 913 in the sliding space 911. The positive and negative polarities of the magnetic members 21 of each row alternate with each other in the X-direction.

The coil assembly 3 is connected to the carriage 92 and disposed in the magnetic rail assembly 2. The coil assembly 3 forms a generally I-shaped cross section transverse to the X-direction and has upper and lower grooves for receiving the two rows of magnetic members 21. As such, the coil assembly 3 when being energized is slidable between the two rows of the magnetic members 21 in the X-direction.

In this embodiment, the coil assembly 3 includes a coil base 4 and a plurality of coil units 5.

The coil base 4 is a circuit board that is elongated in the X-direction and that is electrically coupled to the coil units 5. To enable the coil base 4 and the coil units 5 to be clearly visible, the wiring connection therebetween is omitted in the drawings.

Figure 5:
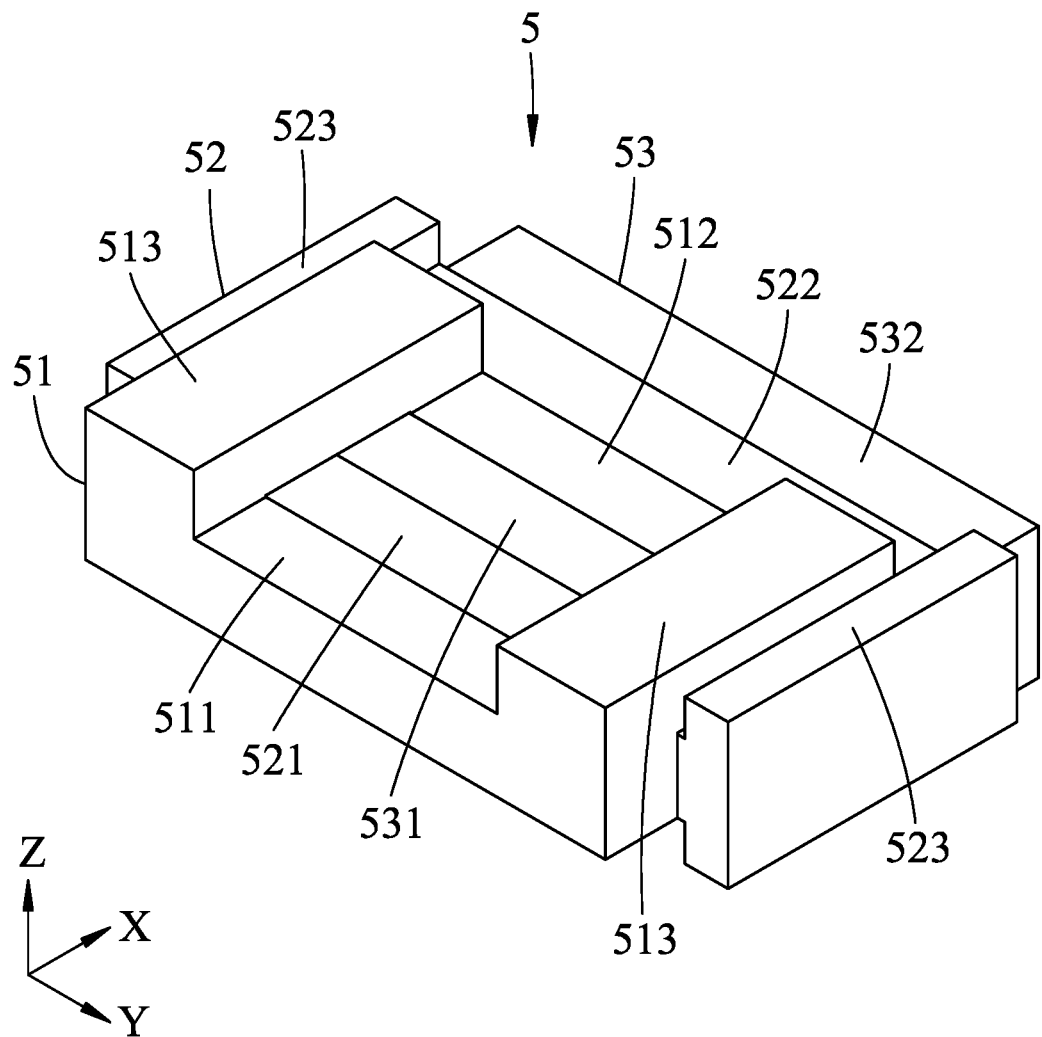
FIG. 5 is a perspective view illustrating one of the coil units of the embodiment.
Figure 6:
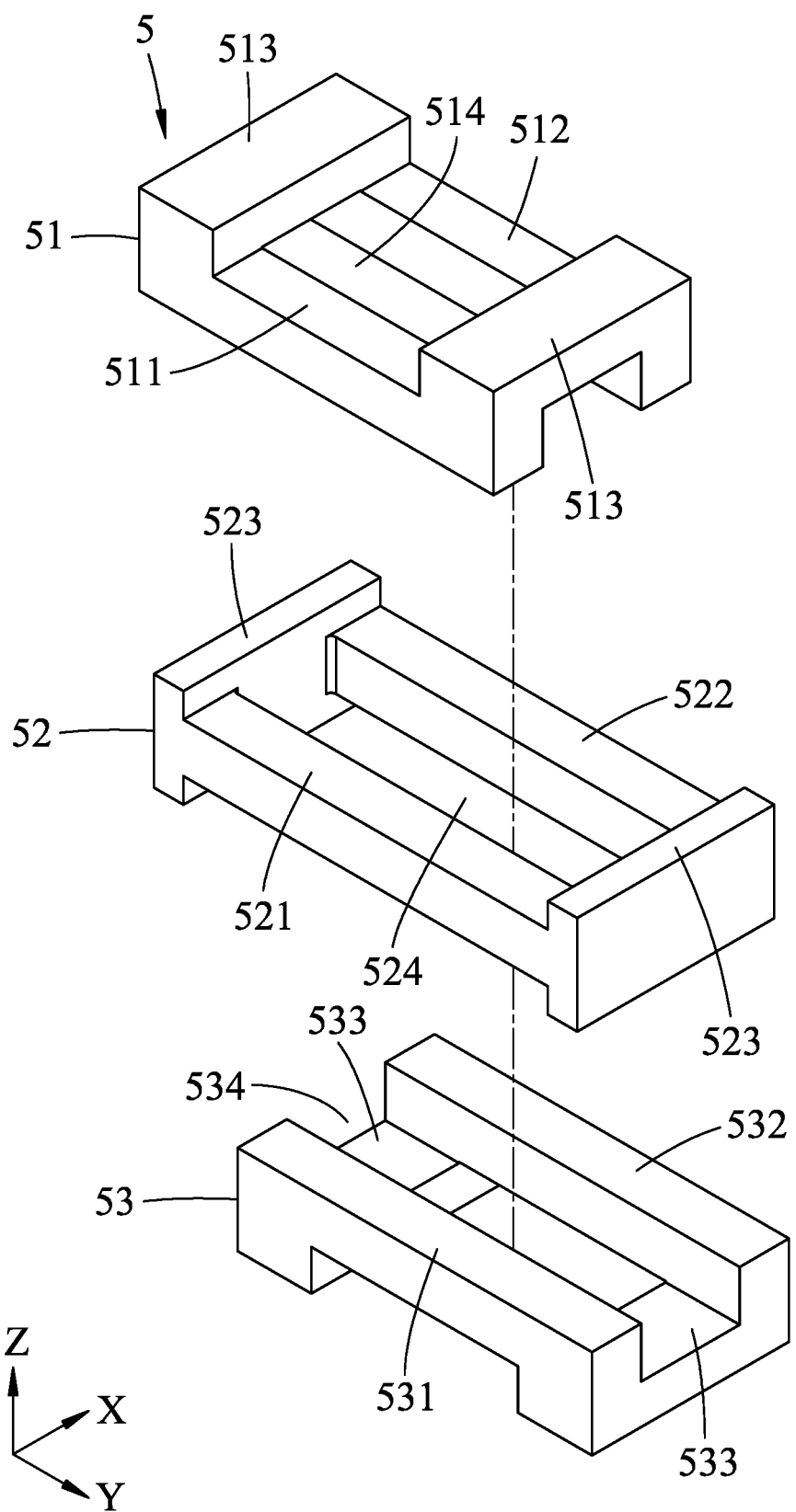
FIG. 6 is an exploded perspective view of FIG. 5.

Referring to FIGS. 4 to 6, the coil units 5 are arranged in the X-direction and connected to the coil base 4. Each coil unit 5 includes a top coil module 51, an intermediate coil module 52, and a bottom coil module 53 to form a three-phase coil structure. Each of the top, intermediate and bottom coil modules 51, 52, 53 has a first interaction side 511, 521, 531, a second interaction side 512, 522, 532 spaced apart from the first interaction side 511, 521, 531 in the X-direction, and two non-interaction sides 513, 523, 533 that are spaced apart from each other in a Y-direction transverse to the X-direction and that are connected to the first interaction side 511, 521, 531 and the second interaction side 512, 522, 532. The first and second interaction sides 511, 521, 531, 512, 522, 532 and the non-interaction side 513, 523, 533 of each of the top, intermediate and bottom coil modules 51, 52, 53 cooperatively form a loop that surrounds an accommodating space 514, 524, 534.

The first interaction sides 521, 531 of the intermediate and bottom coil modules 52, 23 are juxtaposed with each other and are fittingly inserted into the accommodating space 514 of the top coil module 51. The second interaction sides 512, 522 of the top and intermediate coil modules 51, 52 are juxtaposed with each other and are fittingly inserted into the accommodating space 534 of the bottom coil module 53. The second interaction side 512 of the top coil module 51 and the first interaction side 531 of the bottom coil module 53 are juxtaposed with each other and are fittingly inserted into the accommodating space 524 of the intermediate coil module 52.

The first interaction side 511 of the top coil module 51, the first interaction side 521 of the intermediate coil module 52, the first interaction side 531 of the bottom coil module 53, the second interaction side 512 of the top coil module 51, the second interaction side 522 of the intermediate coil module 52, and the second interaction side 532 of the bottom coil module 53 are arranged in the X-direction in the order as defined above. As shown in FIGS. 2, 4 and 5, when the coil assembly 3 is energized, the first interaction sides 511, 521, 531 and the second interaction sides 512, 522, 532 interact with the two rows of the magnetic members 21 to generate a pushing force to move the coil assembly 3 in the X-direction.

As shown in FIGS. 4 to 6, the top coil module 51 and the bottom coil module 53 of two adjacent ones of the coil units 5 are non-overlapping in a Z-direction transverse to the X-direction and the Y-direction. For each coil unit 5, the non-interaction sides 523 of the intermediate coil module 52 respectively form two end sections each of which forms a T-shaped cross section and protrudes upward and downward. The non-interaction sides 513 of the top coil module 51 respectively form two end flanges that protrude upward between the end sections of the intermediate coil module 52. The non-interaction sides 533 of the bottom coil module 53 respectively form two end flanges that protrude downward between the end sections of the intermediate coil module 52. Therefore, a dimension of each coil unit 5 in the Y-direction can be reduced after the top, intermediate and bottom coil modules 51, 52, 53 are fittingly assembled together in the Z-direction.

The first and second interaction sides 511, 512 of the top coil module 51, the first and second interaction sides 521, 522 of the intermediate coil module 52, and the first and second interaction sides 531, 532 of the bottom coil module 53 have equal dimensions in the X-direction. Each of the accommodating spaces 514, 524, 534 is designed to have a dimension in the X-direction that is two times of the dimension of each of the first interaction sides 511, 521, 531 in the X-direction. Therefore, the first interaction sides 511, 521, 531 of the top, intermediate and bottom coil modules 51, 52, 53 and the second interaction sides 512, 522, 532 of the top, intermediate and bottom coil modules 51, 52, 53 can be fittingly interlocked with the accommodating spaces 514, 524, 534.

Figure 7:
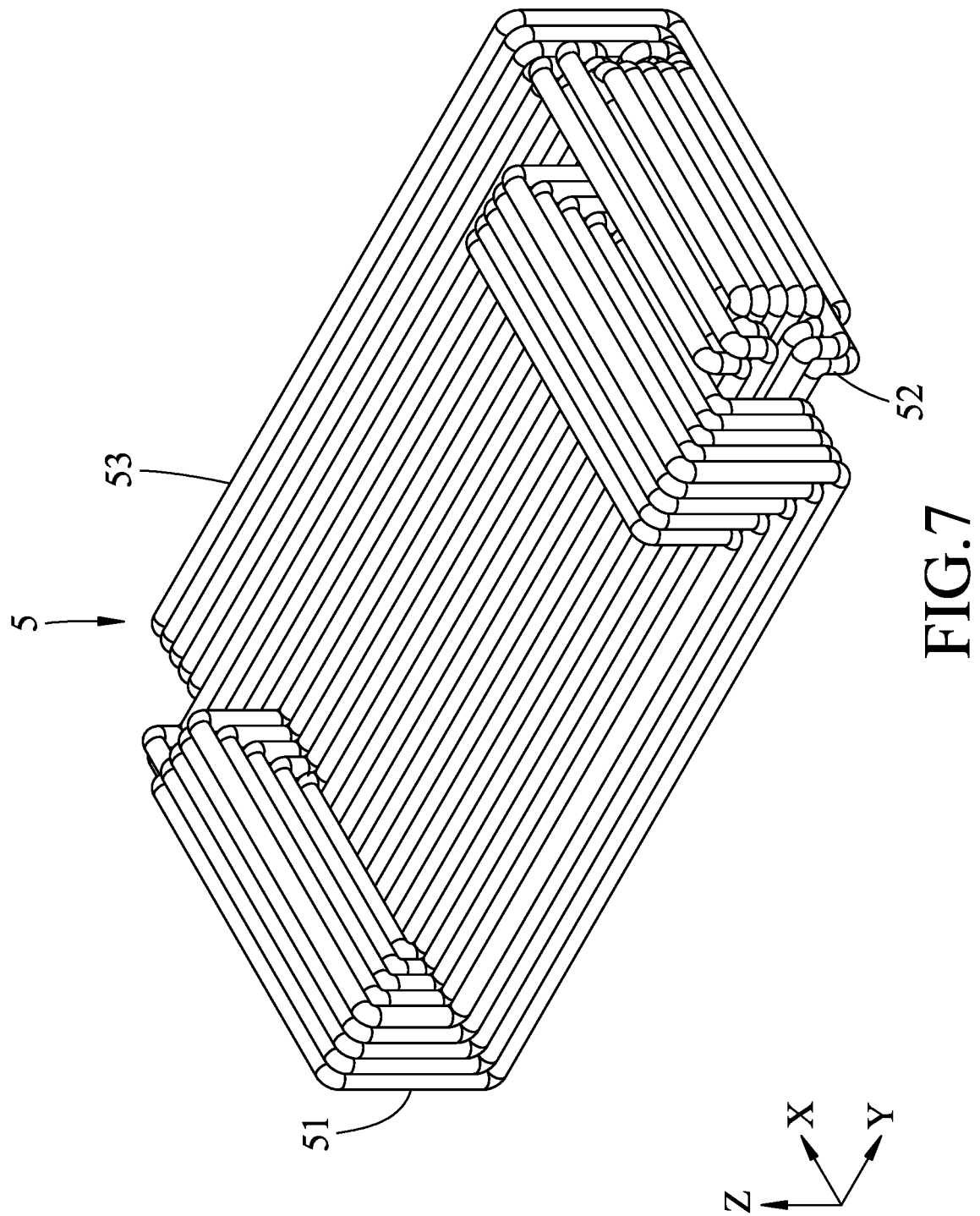
FIG. 7 is a perspective view of the embodiment illustrating the winding structure of each coil unit.
Figure 8:
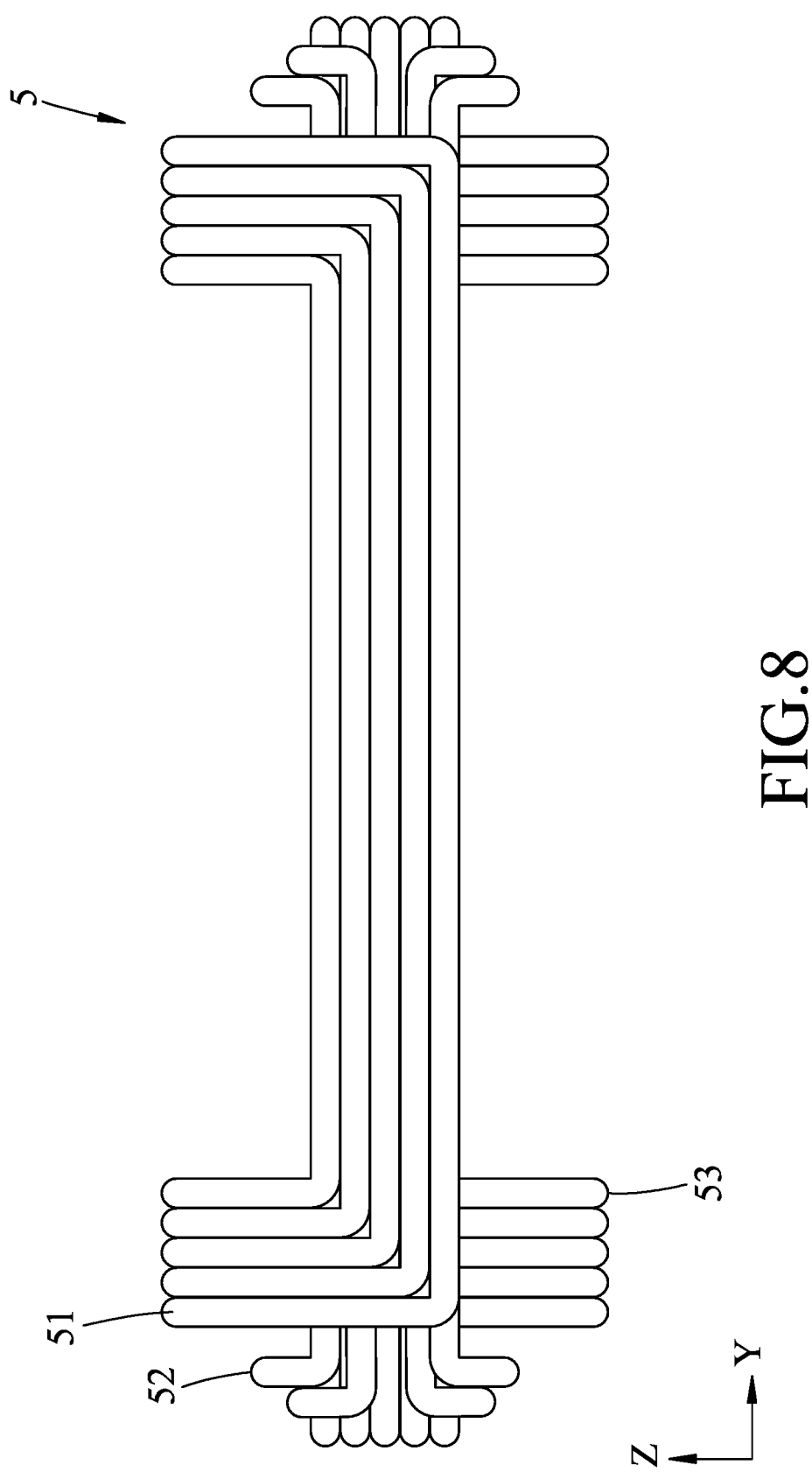
FIG. 8 is a side view of the embodiment illustrating the winding structure of each coil unit.

FIGS. 7 and 8 illustrate the practical winding structure of each coil unit 5.

Figure 1:
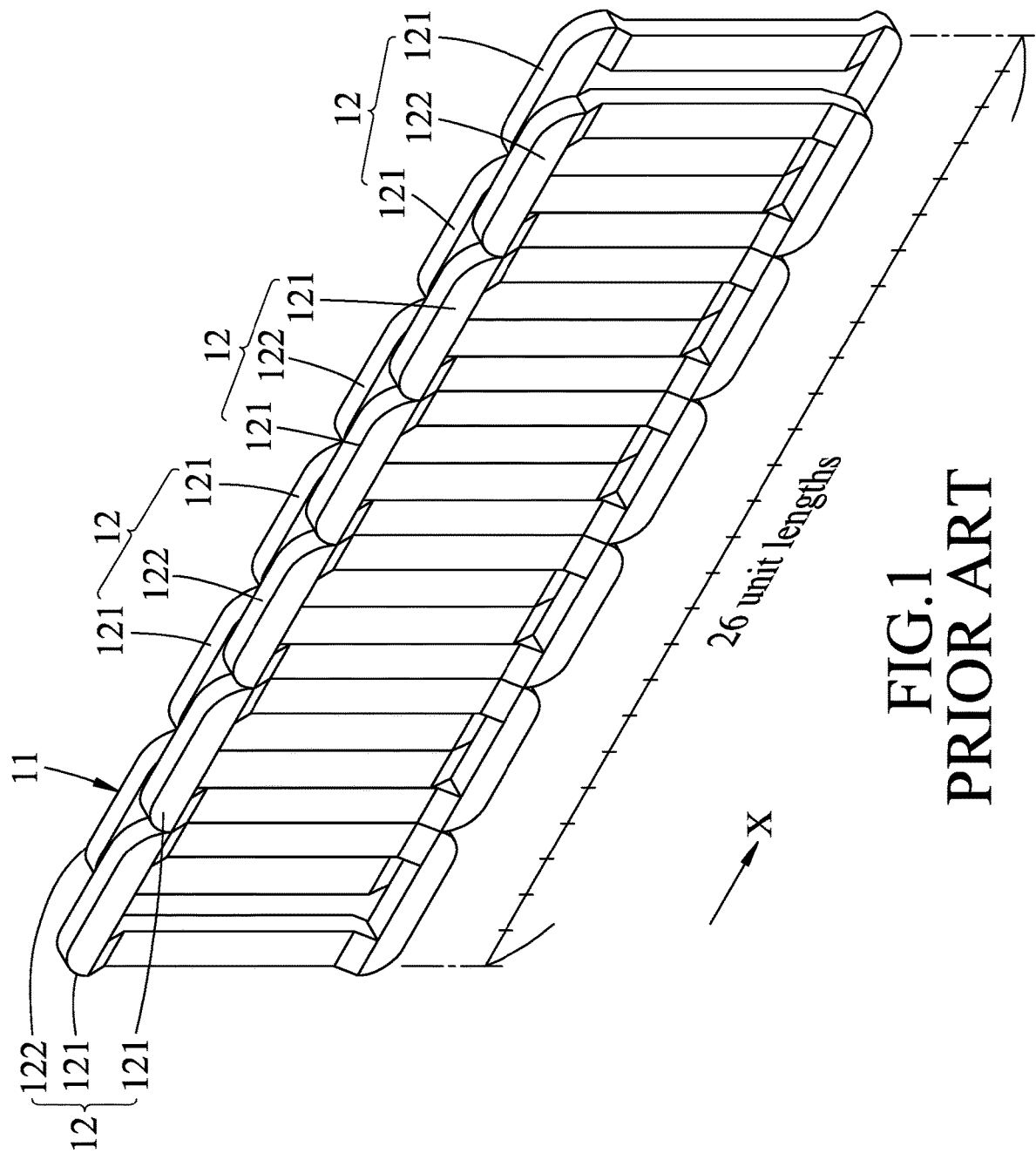
FIG. 1 is a perspective view illustrating a conventional coil assembly of an ironless linear motor.

To sum up, the coil assembly 3 has the following advantages:

1. Because the first interaction sides 521, 531 of the intermediate and bottom coil modules 52, 23 are juxtaposed and inserted fittingly within the accommodating space 514 of the top coil module 51, and because the second interaction sides 512, 522 of the top and intermediate coil modules 51, 52 are juxtaposed and inserted fittingly within the accommodating space 534 of the bottom coil module 53, an effective space utilization is achieved. Compared with the coil assembly 11 of the prior art composed of four coil units 12 that has 26 unit lengths in the X-direction (see FIG. 1), the coil assembly 3 including four coil unit 5 has only 24 unit lengths in the X-direction (see FIG. 4). In other words, the coil assembly 3 in the X-direction can be reduced in length by 8 percent in comparison with the prior art, while still providing the power density equal to or higher than that of the prior art.

2. As shown in FIG. 4, the top coil module 51 of each coil unit 5 does not overlap the bottom coil module 53 of an adjacent coil unit 5 in the Z-direction, unlike the prior art shown in FIG. 1. Further, each coil unit 5 is a unitary assembly. Therefore, the length of the coil assembly 3 can be increased just by placing a new coil unit 5 in juxtaposition with the last one of the existing row of the coil units 5 without rearranging the existing coil units 5. It can save time to assemble the coil assembly 3.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A coil assembly of an ironless linear motor, comprising:
   a coil base elongated in an X-direction; and
   a plurality of coil units arranged in the X-direction and connected to said coil base, each of said coil units including a top coil module, an intermediate coil module, and a bottom coil module, each of said top, intermediate and bottom coil modules having a first interaction side, a second interaction side spaced apart from said first interaction side in the X-direction, and two non-interaction sides that are spaced apart from each other in a Y-direction transverse to the X-direction and that are connected to said first interaction side and said second interaction side;
   wherein said first and second interaction sides and said non-interaction sides of each of said top, intermediate and bottom coil modules cooperatively form a loop that surrounds an accommodating space;
   wherein said first interaction sides of said intermediate and bottom coil modules are juxtaposed with each other and situated within said accommodating space of said top coil module;
   wherein said second interaction sides of said top and intermediate coil modules are juxtaposed with each other and situated within said accommodating space of said bottom coil module;
   wherein said second interaction side of said top coil module and said first interaction side of said bottom coil module are juxtaposed with each other and situated within said accommodating space of said intermediate coil module; and
   wherein, for each of said coil units, said non-interaction sides of said intermediate coil module respectively form two end sections each of which forms a T-shaped cross section and protrude upward and downward, said non-interaction sides of said top coil module respectively forming two end flanges that protrude upward between said end sections of said intermediate coil module, said non-interaction sides of said bottom coil module respectively forming two end flanges that protrude downward between said end sections of said intermediate coil module.

2. The coil assembly as claimed in claim 1, wherein said first interaction side of said top coil module, said first interaction side of said intermediate coil module, said first interaction side of said bottom coil module, said second interaction side of said top coil module, said second interaction side of said intermediate coil module, and said second interaction side of said bottom coil module are arranged in the X-direction in the order as defined above.

3. The coil assembly as claimed in claim 1, wherein said top coil module and said bottom coil module of two adjacent ones of said coil units are non-overlapping in a Z-direction transverse to the X-direction and the Y-direction.

4. The coil assembly as claimed in claim 1, wherein:
   for each of said coil units, said first interaction sides of said intermediate and bottom coil modules juxtaposed with each other are fittingly inserted into said accommodating space of said top coil module;
   for each of said coil units, said second interaction sides of said top and intermediate coil modules juxtaposed with each other are fittingly inserted into said accommodating space of said bottom coil module; and
   for each of said coil units, said second interaction side of said top coil module and said first interaction side of said bottom coil module juxtaposed with each other are fittingly inserted into said accommodating space of said intermediate coil module.

5. An ironless linear motor, comprising:
   a magnetic rail assembly including spaced-apart upper and lower rows of magnetic members extending in an X-direction, positive and negative polarities of said magnetic members of each of said rows alternating with each other in the X-direction; and
   a coil assembly slidable between said rows of said magnetic members, said coil assembly including
   a coil base elongated in the X-direction, and
   a plurality of coil units arranged in the X-direction and connected to said coil base, each of said coil units including a top coil module, an intermediate coil module, and a bottom coil module, each of said top, intermediate and bottom coil modules having a first interaction side, a second interaction side spaced apart from said first interaction side in the X-direction, and two non-interaction sides that are spaced apart from each other in a Y-direction transverse to the X-direction and that are connected to said first interaction side and said second interaction side;
   wherein said first and second interaction sides and said non-interaction side of each of said top, intermediate and bottom coil modules cooperatively form a loop that surrounds an accommodating space;
   wherein said first interaction sides of said intermediate and bottom coil modules are juxtaposed with each other and situated within said accommodating space of said top coil module;
   wherein said second interaction sides of said top and intermediate coil modules are juxtaposed with each other and situated within said accommodating space of said bottom coil module; and
   wherein, for each of said coil units, said non-interaction sides of said intermediate coil module respectively form two end sections each of which has a T-shaped cross section and protrudes upward and downward, said non-interaction sides of said top coil module respectively forming two end flanges that protrude upward between said end sections of said intermediate coil module, said non-interaction sides of said bottom coil module respectively forming two end flanges that protrude downward between said end sections of said intermediate coil module.

6. The ironless linear motor as claimed in claim 5, wherein said second interaction side of said top coil module and said first interaction side of said bottom coil module are juxtaposed with each other and situated within said accommodating space of said intermediate coil module.

7. The ironless linear motor as claimed in 5, wherein said first interaction side of said top coil module, said first interaction side of said intermediate coil module, said first interaction side of said bottom coil module, said second interaction side of said top coil module, said second interaction side of said intermediate coil module, and said second interaction side of said bottom coil module are arranged in the order as defined above.

8. The ironless motor as claimed in claim 5, wherein said first and second interaction sides of said top coil module, said first and second interaction sides of said intermediate coil module, and said first and second interaction sides of said bottom coil module have equal dimensions in the X-direction.

\* \* \* \* \*